United States Patent [19]
LoJacono, Jr.

[11] Patent Number: 5,495,692
[45] Date of Patent: Mar. 5, 1996

[54] ROOT PROTECTION APPARATUS

[76] Inventor: Francis X. LoJacono, Jr., Rte. 2, Box 172B, Templeton, Calif. 93465

[21] Appl. No.: 197,243

[22] Filed: Feb. 16, 1994

[51] Int. Cl.⁶ .................................................. A01G 9/02
[52] U.S. Cl. .............................. 47/78; 220/8; 220/485
[58] Field of Search .......................... 47/76, 78; 220/8, 220/485, 491, 494

[56] References Cited

U.S. PATENT DOCUMENTS

| | | | |
|---|---|---|---|
| 1,027,215 | 5/1912 | Poppert | 220/485 |
| 1,032,731 | 7/1912 | Barnett | 220/8 |
| 1,171,924 | 2/1916 | Brown | 220/485 |
| 1,296,742 | 3/1919 | Bevington | 220/8 |
| 1,565,120 | 12/1925 | Thompson | 220/485 |
| 2,632,578 | 3/1953 | Brickman | 220/485 |
| 4,250,664 | 2/1981 | Remke | 47/76 |
| 4,296,726 | 10/1981 | Ross et al. | 220/485 |
| 5,090,157 | 2/1992 | Sipala | 47/76 |

FOREIGN PATENT DOCUMENTS

| | | | |
|---|---|---|---|
| 270440 | 9/1912 | German Dem. Rep. | 220/8 |
| 2951655 | 7/1981 | Germany | 47/78 |

Primary Examiner—Terry Lee Melius
Assistant Examiner—Joanne C. Downs
Attorney, Agent, or Firm—Francis X. LoJacono

[57] ABSTRACT

The present invention provides a protective apparatus for a root system of a tree and/or plant which is defined by a collapsible wire basket structure that includes a support strap adapted to be rotatably mounted and secured across the opening of the basket so as to support the basket when the basket is positioned around the soil-bound root system of the tree or plant.

6 Claims, 3 Drawing Sheets

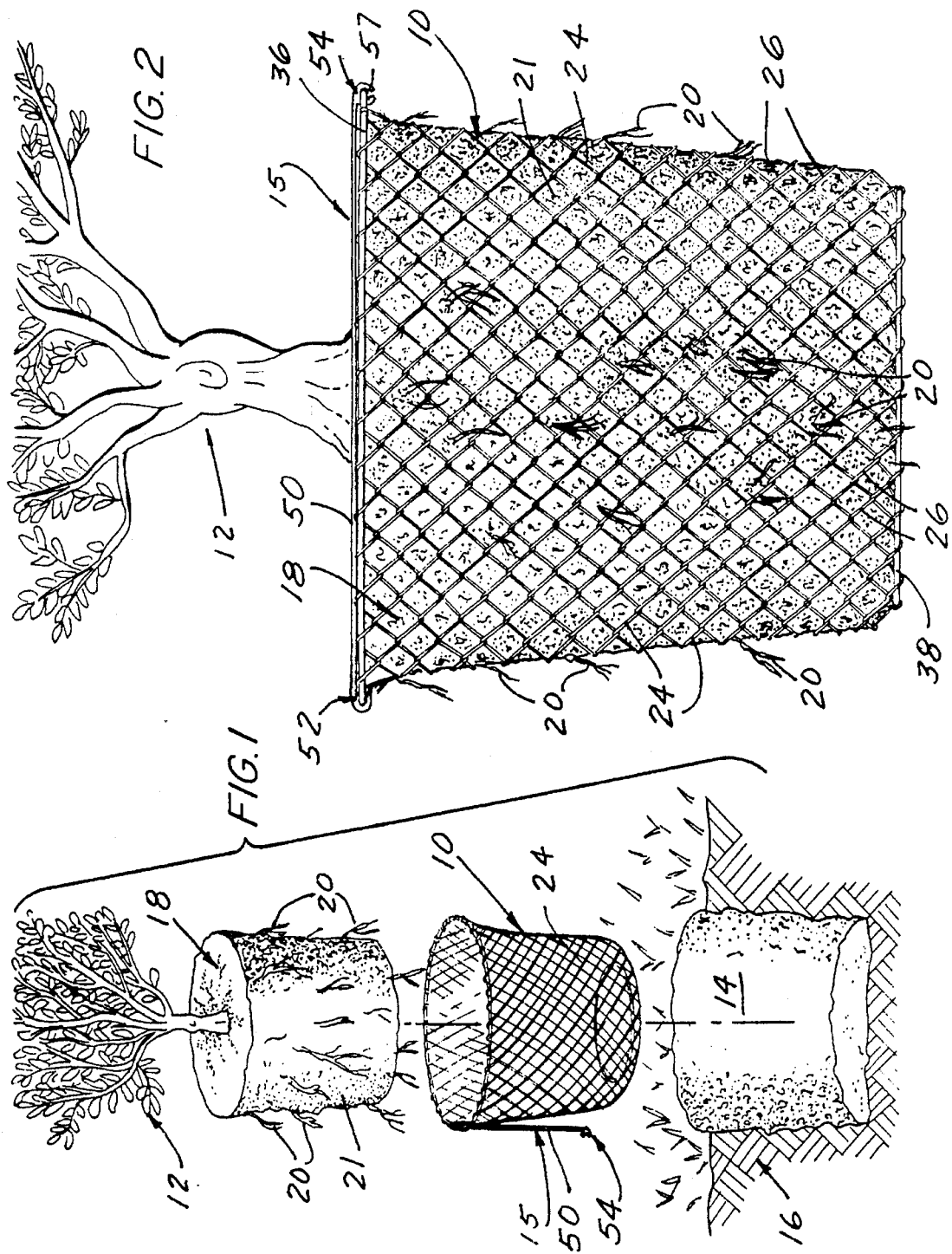

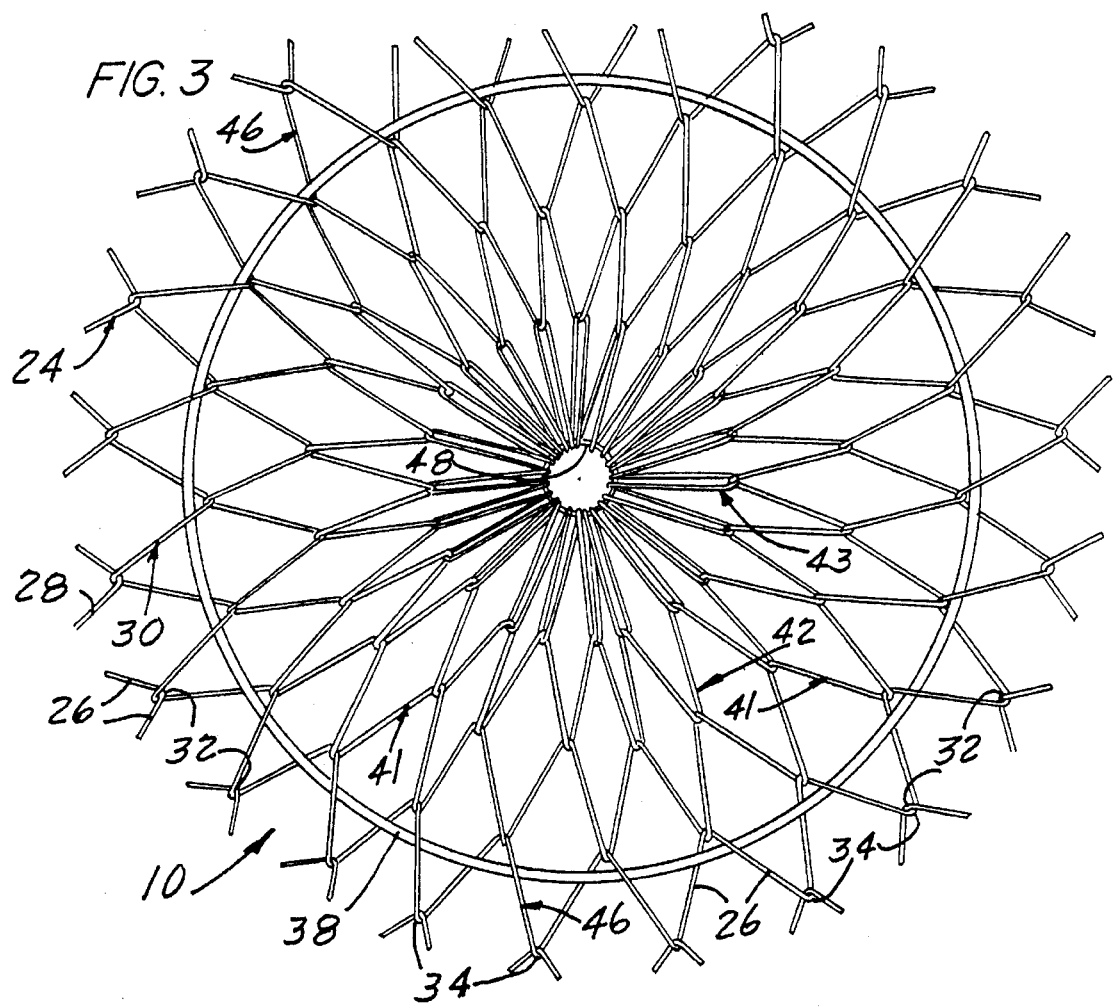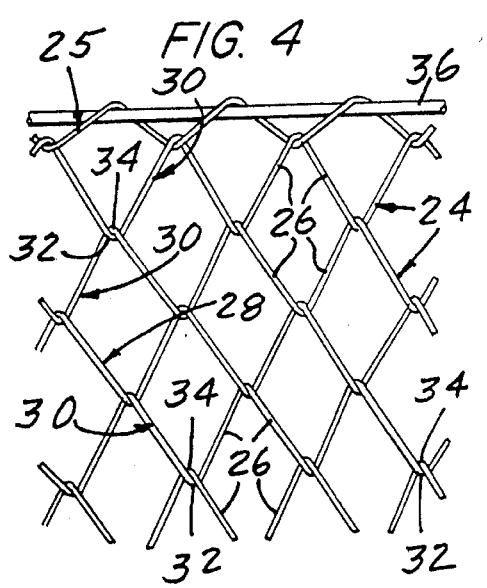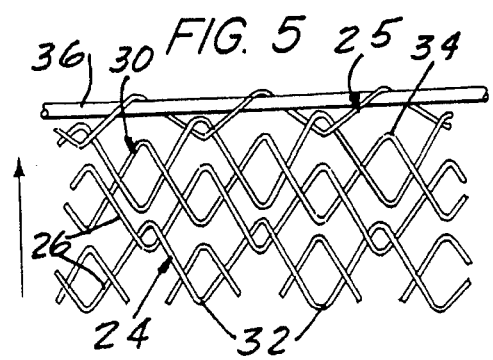

5,495,692

ROOT PROTECTION APPARATUS

BACKGROUND OF THE INVENTION

1. Field of the Invention

The present invention relates generally to a collapsible basket that is employed to protect roots of trees and plants from destruction by underground rodents such as gophers and moles, and more particularly to a collapsible wire basket that is adapted to be expanded so as to receive and confine the entire soil-bound root system of young trees and/or plants within the basket by means of a support strap, which is attached to the basket.

2. Description of the Prior Art

As is well known in the art, various problems and difficulties are encountered in providing suitable means for protecting the young tender roots of trees and plants that are often planted in areas infested with underground rodents.

Many types of devices and methods have been used and are still being employed at the present time to safely rid an area of gophers and moles. There are gopher traps of all types including above-ground as well as in-ground devices. However, traps are generally inadequate in eliminating all of the rodent infestation in a given area. Poison chemicals are also used but chemical methods are generally no longer accepted since they create a dangerous environmental condition, particularly in areas inhabited or used by children and pets. This is especially true adjacent landscaped areas.

In locations that have a history of rodent problems, the gardener will typically dig a hole in the ground and line the hole with chicken wire prior to placing a tree or plant into the hole so that, when the base of the tree or plant is inserted into the dug hole, it will be surrounded by the protective wire. However, this method is often not employed as chicken wire is not always available or it is very difficult and time-consuming to dig a hole with the larger diameter necessary when using protective wire mesh.

Another alternative method of protecting plants from underground rodents such as gophers is to modify the landscape by planting trees in raised beds having built-in underground protection at the bottom, thus requiring substantial visual alteration of the landscaping, not to mention the additional time and expense of modifying the landscaping. The average homeowner does not relish the hard work, extra time, and the added expense needed for such modifications. Thus, any effective remedy must be relatively simple to install and inexpensive to maintain.

As examples of tree and plant protective devices one may refer to German Patent 2418412, November/1975, which is a non-collapsible wire basket, or more particularly to German Patent 2951-655, July/1981, which is a collapsible basket similar to the present invention. However, after testing this type of basket it was found that, because it is designed to collapse, it requires two individuals to successfully mount it since it lacks a support means to prevent it from dropping loose from the tree root system when it is moved to position the root system in the ground.

Another example is U.S. Pat. No. 4,019,279, ROOT CONTROL PLANTER, issued to M. D. Moorman. This particular device comprises a plant container having slick sloping side walls of impenetrable material that is buried in the ground with a young tree positioned therein, whereby the container prevents the roots of the tree from pushing against and cracking a nearby sidewalk.

OBJECTS AND ADVANTAGES OF THE INVENTION

It is an important object of the present invention to provide a means for addressing all of the above-mentioned problems that relate to the protection of plant roots from underground rodents.

Another object of the invention is to provide a collapsible wire basket having a support device attached to the upper annular wire-support ring.

Still another object to the present invention is to provide a collapsible wire basket of this character wherein the support device comprises an elongated strap member adapted to be rotatably attached at one end to the upper annular wire-support ring and, when the basket is raised around the soil-bound root system, the strap member is rotated across the opening of the basket, whereby the free end of the strap is snapped into a locked position with respect to the opposite side of the basket opening, thereby preventing the basket from collapsing and falling free of the soil-bound root system of the plant.

It is another object of the invention to provide a basket as recited above with a support strap that is formed preferably from plastic material having a length suitable to connect it to a given size basket, and wherein the support strap includes integrally formed locking members at each end thereof, one end of the support strap being adapted to be rotatably secured to the upper support ring, with the oppositely disposed locking member being attached to the opposite side of the ring member of the basket.

A further object of the present invention is to provide a collapsible wire basket in combination with a support strap, wherein the strap also includes at least one integrally formed clip member adapted to receive and secure drip tubing of a size to correspond to the size of the clip member. This allows the strap to be used both as a means to support the collapsible basket, and as a means for mounting various types and sizes of tubing used in conjunction with drip watering systems.

Still another object of the present invention is to provide an apparatus to protect the root system of trees and other types of plants wherein the apparatus is easy to install, relatively inexpensive to manufacture, and is simple but rugged in construction.

Yet another object of the present invention is to provide a root protective device of this character that is formed with a collapsible wire basket-like structure whereby the structure can be easily packaged and stacked in a space-saving arrangement for storing as well as for shipping.

The foregoing is a description of several preferred embodiments of the invention which are given here by way of example only. The invention is not to be taken as limited to any of the specific features as described, but comprehends all such variations as come within the scope of the appended claims.

BRIEF DESCRIPTION OF THE DRAWINGS

With the above and related objects in view, the invention consists in the details of construction and combination of parts, as will be more fully understood from the following description, when read in conjunction with the accompanying drawings and numbered parts, in which:

FIG. 1 is an exploded pictorial view of the present invention, wherein the ground is shown in cross-section with a hole dug therein to receive a collapsible wire basket which is expanded to receive the root base of a tree, and wherein a support strap is secured at one end to the upper support ring of the collapsible basket;

FIG. 2 is an enlarged side-elevational view of the protective basket-like container, wherein the soil-bound root system of the tree is supported in the container and the container is fixedly supported to the soil-bound root system by means of the support strap that extends across the opening of the basket so as to be attached on the opposite side of the upper support ring;

FIG. 3 is a bottom plan view of the bottom structure of the wire basket;

FIG. 4 is an enlarged view of the small portion of the upper side-wall structure of the basket, wherein each sinusoidal wire strand is shown interlinked in a fully expanded mode;

FIG. 5 is an enlarged view again of a small portion of the upper side-wall structure of the basket, wherein the wire strands are shown in a partially collapsed mode;

DESCRIPTION OF THE PREFERRED EMBODIMENT

Figure 6:
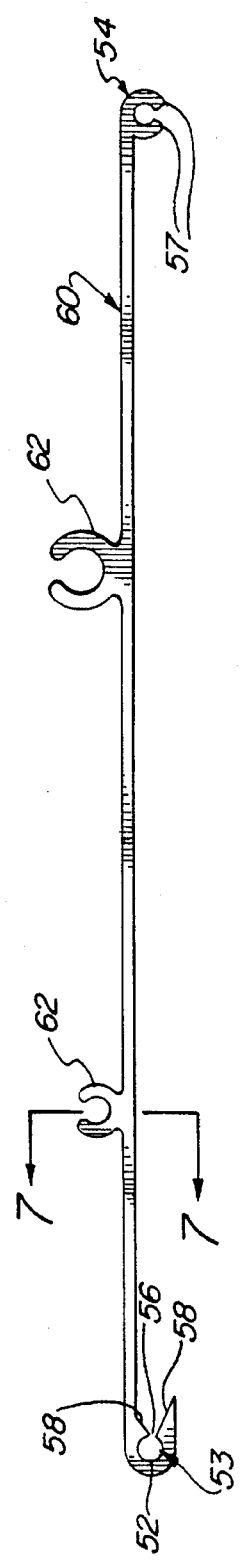
FIG. 6 is an enlarged side-elevational view of the support strap having a pair of drip line hoses formed thereon.
Figure 7:
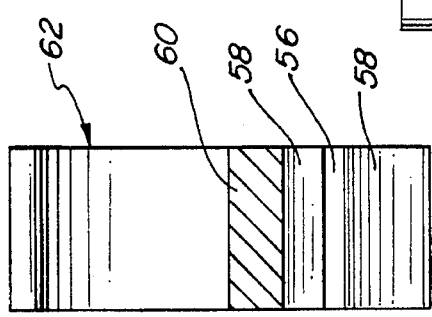
FIG. 7 is an enlarged cross-sectional view taken substantially along line 7—7 of FIG. 6.
Figure 8:
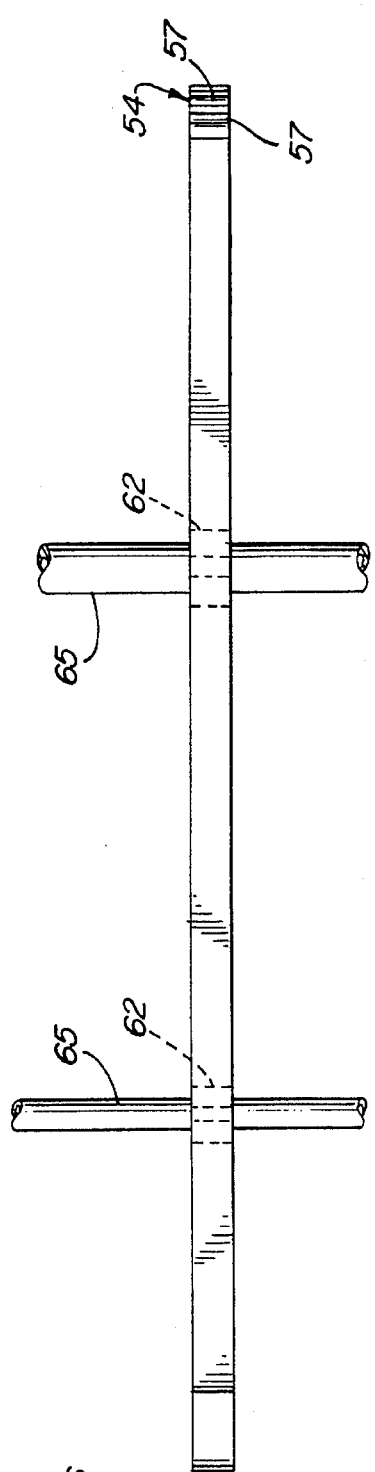
FIG. 8 is a bottom plan view of the support strap as seen in FIG. 6, and including drip lines mounted in each of the drip line clip members.

Referring more particularly to FIG. 1, there is illustrated an exploded pictorial view of the sequential arrangement of the present invention which defines a protective collapsible basket, illustrated in an expanded mode and generally indicated at 10, to receive the root system of a young tree and/or plant, indicated by numeral 12. A hole 14 is formed in the ground soil 16 so as to receive root system 12 therein when root base 18, also referred to as the soil-bound root system, of the plant is positioned within the protective basket 10, as shown in FIG. 2.

In FIG. 1 there is also shown a basket support means, indicated at 15, that is rotatably attached at one end to an upper support ring 36 which defines the open end of the basket. Support means 15 will be described in more detail in the following description.

As mentioned heretofore, young trees and plants, such as seen in FIG. 1 and 2, when first planted are generally placed in the ground without any protection from underground rodents, particularly gophers and moles. The young tender roots of these trees and plants are often attacked and eaten by such rodents. Thus, in a short period of time the trees and plants are left standing without a root system and quickly die..

Accordingly, the protective basket 10, as is herein disclosed, solves this problem in a very simple manner by enclosing root base 18 of plant 12, which includes a root system 20 and soil 21, within the protective basket 10. For simplicity, the word "plant" will hereinafter be used generically to define trees, bushes and all other garden or landscape plants. Protective basket 10 is defined as a collapsible wire-like basket that is generally in a collapsed and substantially flat form and is expanded to a size equal to the size of the plant's soil-bound root system. The basket comprises a circular wall structure having a multiplicity of annularly formed sinusoidal wire strands 24 that are interlinked to define a loosely woven mesh. That is, each wire strand 24 is provided with contiguously arranged, obliquely positioned, side members 26 that define alternating V-shaped and inverted V-shaped members 28 and 30, respectively. The V-shaped members 28 are defined by a lower apex 32 and the contiguous pair of downwardly converging side members 26. The inverted V-shaped members 30 are defined by the pair of contiguous oblique side members 26 that converge upwardly to terminate as an upper apex 34. Thus, it can be seen in FIGS. 4 and 5 that the juxtaposed sinusoidal strands 24 are loosely interwoven to define what could be referred to as a chain-like weave structure.

A first upper strand or annular link 25 is provided with an upper support ring 36 that defines the enlarged opening of container 22, the support ring 36 being positioned throughout the annular weave of the upper strand 25. A lower support ring 38 defines the lower diameter of basket 10, the lower support ring having a smaller diameter than the upper support ring 36. Lower support ring 38 also supports a bottom wall structure, indicated generally at 40, which establishes the lower closed end of the basket. The bottom wall structure 40 is also formed with a plurality of annularly arranged sinusoidal wire strands 41, 42 and 43, wherein the respective strands are arranged with increasingly steep oblique side members 45. Strand 41 of bottom wall 40 is linked to the lowermost strand 46 of the side wall structure, this lowermost strand being supported by lower support ring 38, as illustrated in FIGS. 2 and 3. The inner strand 43 of the bottom wall structure is supported by an inner ring member 48.

Thus, from the above description it can be understood that the collapsible basket 10 is adapted to be arranged in a collapsed mode for storage, whereby several baskets can be stored substantially flat in a box or container (not shown), and then easily extended in an operational mode so as to receive the soil-bound root system 18 of a plant. The present invention is more particularly designed to accommodate an established root base, as seen in the exploded view of FIG. 1, which is generally found in plants and trees that are grown for commercial landscape nurseries where the plants are usually sold in one or five gallon plastic containers.

To prevent the opened or extended basket from collapsing around the soil-bound root system, there is employed a basket support device 15 which is formed as an elongated strap 50 of suitable semi-rigid plastic material. Strap 50 includes attaching means which are integrally formed at the opposite ends of the trap. The attaching means comprises a first coupling member 52 which is adapted to be rotatably attached at one end to the upper annular wire-support ring 36. When the basket is positioned around the soil-bound root system, as illustrated in FIG. 2, strap 50 is rotated across the opening of the basket and secured to the opposite side of support ring 36 by means of a second coupling member 54 formed at the opposite end of the strap.

The first coupling member 52 is formed with a first coupling means comprising a first coupling member having a keeper means 53 formed therein to receive the support ring for rotation thereon. The keeper means comprises a horizontally disposed slotted opening 56 which is defined by a pair of oppositely disposed inclined lip members 58 that are arranged to be snapped in a rotatable arrangement over support ring 36. The second coupling member 54 is formed with a downwardly projecting locking means comprising a vertically positioned C-shaped clamp member that includes a pair of oppositely arranged lip members 57 adapted to receive the opposite side of the basket support ring 36, whereby the fully extended basket is prevented from collapsing and falling free of the soil-bound root system of the plant.

Referring now to FIG. 6, there is shown a second embodiment of a basket support strap, indicated at 60, wherein strap 60 includes one or more clip members 62 that are integrally formed along the top of the elongated strap body 50. These clip members are formed in a vertically disposed, semicircular, and somewhat C-shaped configuration which is adapted to removably receive a corresponding size hose line, as indicated at 65, sometimes referred to as a drip line. These drip lines have a diameter of ¼ inch to ½ inch.

It may be seen that the objects of the present invention set forth herein, as well as those made apparent from the foregoing description, are efficiently attained. While preferred embodiments of the invention have been set for for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What I claim is:

1. In combination, an apparatus for protecting the soil-bound root system of a plant comprising a collapsible wire basket structure having a plurality of annularly interlinked sinusoidal wire strands defining a circumferential side wall and a bottom wall, said sinusoidal wire strands being loosely woven and connected to an upper annular support ring so as to be expanded to allow said collapsible wire basket structure to receive and confine the soil-bound root system, and wherein the improvement comprises:

means for supporting said collapsible wire basket structure in an extended position around said soil-bound root system, said supporting means being formed so as to be mounted to said upper annular support ring in a position over the top of said soil-bound root system, and said support means including a first coupling means rotatably attached to said upper annular support ring and a second coupling means for fixedly securing said support means to said upper annular support ring of said collapsible wire basket structure;

said supporting means comprising an elongated strap having a length corresponding to a distance between opposite sides of said upper annular support ring of said collapsible basket, wherein said first coupling member is integrally formed on one end of said strap and said second coupling means is integrally formed on the opposite end of said strap;

wherein said first coupling means comprises a first coupling member having a keeper means formed therein to receive said upper annular support ring for rotation thereon; and wherein said second coupling means comprises locking means formed therein to lockingly engage said upper annular support ring therein when said strap is rotated for engagement with said upper annular support ring.

2. The combination as recited in claim 1, wherein said keeper means comprises a horizontally disposed slotted opening.

3. The combination as recited in claim 2, wherein said locking means comprises a vertically positioned, C-shaped, clamp member.

4. The combination as recited in claim 3, wherein said slotted opening in said keeper means is formed with a pair of converging lip members.

5. The combination as recited in claim 4, wherein said strap is formed with at least one hose clip member.

6. The combination as recited in claim 5, wherein said hose clip member is integrally formed on said strap so as to extend upwardly therefrom.

\* \* \* \* \*